United States Patent
Yang

(10) Patent No.: US 10,634,957 B2
(45) Date of Patent: Apr. 28, 2020

(54) POST SPACER, LIQUID CRYSTAL DISPLAY PANEL INCLUDING THE SAME, AND METHOD FOR MANUFACTURING LIQUID CRYSTAL DISPLAY PANEL

(71) Applicant: WUHAN CHINA STAR OPTOELECTRONICS TECHNOLOGY CO., LTD, Wuhan, Hubei (CN)

(72) Inventor: Yong Yang, Hubei (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 58 days.

(21) Appl. No.: 15/577,716

(22) PCT Filed: Aug. 11, 2017

(86) PCT No.: PCT/CN2017/097191
§ 371 (c)(1),
(2) Date: Nov. 28, 2017

(87) PCT Pub. No.: WO2019/019226
PCT Pub. Date: Jan. 31, 2019

(65) Prior Publication Data
US 2019/0041679 A1    Feb. 7, 2019

(30) Foreign Application Priority Data
Jul. 28, 2017 (CN) .......................... 2017 1 0631900

(51) Int. Cl.
*G02F 1/1339* (2006.01)
*G02F 1/1337* (2006.01)
(Continued)

(52) U.S. Cl.
CPC ..... *G02F 1/13394* (2013.01); *C08G 73/0273* (2013.01); *C08G 73/065* (2013.01);
(Continued)

(58) Field of Classification Search
CPC ............... G02F 1/13394; G02F 1/1337; G02F 2011/13398; G02F 2011/133354;
(Continued)

(56) References Cited

U.S. PATENT DOCUMENTS

2015/0226991 A1* 8/2015 Han .................... G02F 1/13394
349/43

* cited by examiner

*Primary Examiner* — Ruiyun Zhang
(74) *Attorney, Agent, or Firm* — Mintz Levin Cohn Ferris Glovsky and Popeo, P.C.; Steven M. Jensen

(57) ABSTRACT

The present disclosure discloses a post spacer, which is applied to a liquid crystal display panel. The post spacer has a material having a structure as represented by Formula 1, wherein X includes at least one of groups represented by Formulae 2-1 to 2-5; Y includes at least one of groups represented by Formulae 3-1 and 3-2; at least one of the X and the Y has a molecular chain end having a group capable to chemically cross-link with materials of alignment layers; and at least one of the X and the Y has a side chains having a group capable to generate a hydrogen bond or intermolecular force with a material of liquid crystal molecules. The present disclosure also discloses a liquid crystal display panel having the post spacers described above and a method of manufacturing the same.

17 Claims, 3 Drawing Sheets

(51) Int. Cl.
*C09K 19/54* (2006.01)
*C08G 73/06* (2006.01)
*C08G 73/02* (2006.01)
*G02F 1/1333* (2006.01)

(52) U.S. Cl.
CPC ........ *C08G 73/0644* (2013.01); *C09K 19/542* (2013.01); *G02F 1/1337* (2013.01); *G02F 2001/13398* (2013.01); *G02F 2001/133354* (2013.01); *Y10T 428/1059* (2015.01)

(58) Field of Classification Search
CPC .............. C08G 73/065; C08G 73/0644; C08G 73/0273; C09K 19/542; Y10T 428/1059
USPC .................... 349/155, 156; 428/1.5; 528/367
See application file for complete search history.

POST SPACER, LIQUID CRYSTAL DISPLAY PANEL INCLUDING THE SAME, AND METHOD FOR MANUFACTURING LIQUID CRYSTAL DISPLAY PANEL

CROSS-REFERENCES TO RELATED APPLICATIONS

This application is a U.S. national phase application, pursuant to 35 U.S.C. § 371, of PCT/CN2017/097191, filed Aug. 11, 2017, designating the United States, which claims priority to Chinese Application No. 201710631900.X, filed Jul. 28, 2017. The entire contents of the aforementioned patent applications are incorporated herein by this reference.

TECHNICAL FIELD

The present disclosure relates to a technical field of a liquid crystal display panel, in particular, to a post spacer in a liquid crystal display panel, a liquid crystal display panel having the post spacer, and a method of manufacturing the liquid crystal display panel.

BACKGROUND ART

Generally, a liquid crystal display (LCD) panel has a structure as shown in FIG. 1, which includes a thin film transistor (TFT) substrate 1 and a color filter (CF) substrate 2 that are disposed opposite to each other, and a liquid crystal layer 3 interposed between the TFT substrate 1 and the CF substrate 2. A lower alignment layer 11 is provided in a side of the TFT substrate 1 that is close to the liquid crystal layer 3, an upper alignment layer 21 is provided in a side of the CF substrate 2 that is close to the liquid crystal layer 3, and post spacers (PSs) 4 are provided between the upper alignment layer 21 and the lower alignment layer 11.

In a traditional liquid crystal display panel, generally, a material of the PS 4 is sprayed into the liquid crystal layer 3 by using a spray process, to achieve the purpose of supporting the liquid crystal layer 3 and controlling the liquid crystal cell gap. However, the PS 4 is mostly made of a material selected from some traditional resin type materials. In the liquid crystal layer 3, liquid crystal molecules close to the TFT substrate 1 and the CF substrate 2 are liquid crystal aligned in a manner of rubbing alignment or light alignment; however, since the liquid crystal molecules surrounding the PSs 4 are affected by the material of the PSs 4, the direction of the alignment thereof may appear deviation, such that the deflection of the liquid crystal changes, as shown in FIG. 2, thereby occurring a relatively serious light leakage phenomenon around the PSs 4. In FIG. 2, reference numerals 31 and 32 represent liquid crystal molecules aligned normally and abnormally, respectively. In addition, as for a flexible LCD display device, since the adhesive forces between the PSs 4 and an upper alignment layer 21 and between the PSs 4 and a lower alignment layer 11 are smaller, the PSs 4 may peel off, resulting in a change of the liquid crystal cell gap and influencing the display effect.

SUMMARY

In order to resolve the problem existing in the art above, the present disclosure provides a post spacer, a liquid crystal display panel having the post spacer, and a method of manufacturing the liquid crystal display panel. By modifying a material of the post spacer, when the post spacer is applied to the liquid crystal display panel, the post spacer not only controls the alignments of the liquid crystals surrounding the post spacer and reduces light leakage, but also increases the adhesive force between the post spacer and the alignment layers, to ensure that the liquid crystal cell gap is stable and the display image is normal.

In order to achieve the purpose described above, the present disclosure adopts a technical solution as follows.

A post spacer may be applied to a liquid crystal display panel and include a material having a structure represented by Formula 1:

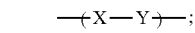

Formula 1

X may include at least one selected from groups represented by Formulae 2-1 to 2-5:

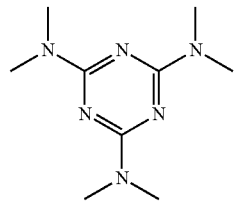

Formula 2-1

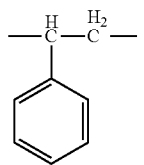

Formula 2-2

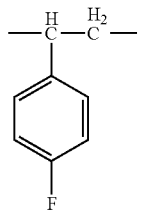

Formula 2-3

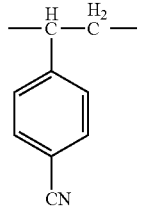

Formula 2-4

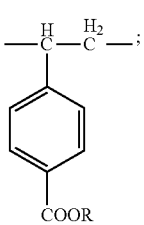

Formula 2-5

Y may include at least one selected from groups represented by Formulae 3-1 and 3-2:

Formula 3-1

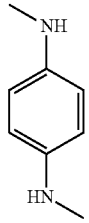

Formula 3-2

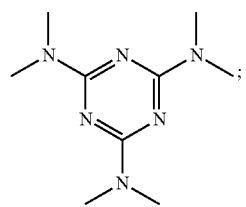

wherein at least one of the X and the Y has a molecular chain end having a first group that is capable of chemically cross-linking with a material of an alignment layer in the liquid crystal display panel; and at least one of the X and the Y has a side chain having a second group that is capable of generating a hydrogen bond or intermolecular force with a material of liquid crystal molecules in the liquid crystal display panel.

Further, the first group may be at least one selected from an azo group, an imide group and an amine group; and the second group may be at least one selected from a $C_8$ to $C_{20}$ alkyl chain, a cyano group, a fluoro group, a hydroxyl group and an ester group.

Further, the material of the liquid crystal molecules may have at least one group selected from a $C_8$ to $C_{20}$ alkyl chain, a cyano group, a fluoro group, a hydroxyl group and an ester group.

Further, the material of the alignment layer may have at least one group selected from an epoxy group, a hydroxyl group and a carboxyl group.

Further, the material of the post spacer may have a structure represented by Formula 4-1 or 4-2 below:

Formula 4-1

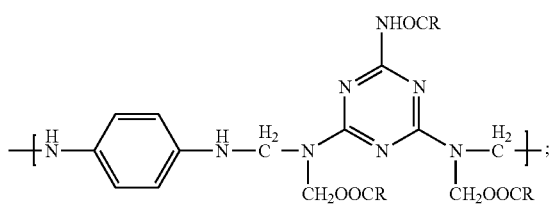

-continued

Formula 4-2

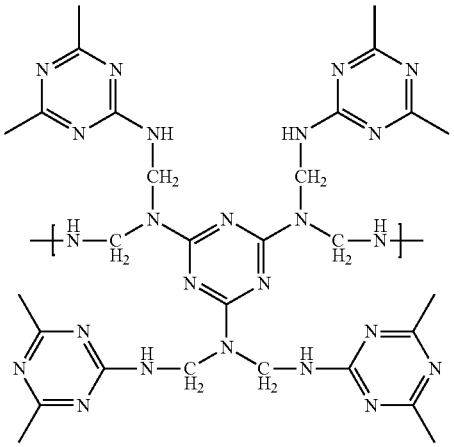

Further, the material of the post spacer may have a net structure, or a linear structure having a relative molecular weight of 50000~100000.

Another purpose of the present disclosure is to provide a liquid crystal display panel which may include: a thin film transistor (TFT) substrate and a color filter (CF) substrate disposed opposite to each other; a liquid crystal layer interposed between the TFT substrate and the CF substrate, wherein a lower alignment layer is provided at a side of the TFT substrate that is close to the liquid crystal layer, an upper alignment layer is provided at a side of the CF substrate that is close to the liquid crystal layer, and post spacers are disposed between the upper alignment layer and the lower alignment layer. The post spacers are any one of the post spacers as describe above. A molecular chain end in material of the post spacer has chemical crosslinking with materials of the upper alignment layer and the lower alignment layer, the hydrogen bond or intermolecular force is generated between the side chain in the material of the post spacer and the liquid crystal molecules of the liquid crystal layer, such that the liquid crystal molecules have an alignment that is consistent with the upper alignment layer and lower alignment layer.

Another purpose of the present disclosure is to provide a method of manufacturing a liquid crystal display panel, which includes the following steps.

S1 comprising providing a thin film transistor (TFT) substrate and a color filter (CF) substrate that are disposed opposite to each other, wherein a lower alignment layer is provided at a side of the TFT substrate facing the CF substrate, and an upper alignment layer is provided at a side of the CF substrate facing the TFT substrate;

S2 comprising aligning the TFT substrate and the CF substrate after liquid crystals are coated on the lower alignment layer and/or the upper alignment layer, and manufacturing a post spacer between the lower alignment layer and the upper alignment layer to form a liquid crystal cell, wherein the post spacers are the post spacers as described in any one of the claims 1-7;

S3 comprising irradiating the liquid crystal cell with ultraviolet light, such that the molecular chain end in the material of the post spacers chemically cross-links with materials of the lower alignment layer and the upper alignment layer to obtain the liquid crystal display panel.

Further, the forming of the post spacers is performed by any of spraying, photolithography, imprinting, and self-assembling.

The present disclosure may provide modifications of the material of the post spacers. When the post spacers are applied to a liquid crystal display panel, on one hand, for example, hydrogen bonds or intermolecular force can be generated between the material of the post spacers and the liquid crystal molecules in the liquid crystal layer, such that the disordered arrangement of the liquid crystal molecules surrounding the post spacers in the prior art can be changed, the liquid crystal molecules can form an alignment effect that is consistent with or similar to the alignment layers, the internal interaction between the liquid crystal molecules is reduced, and the light leakage around the post spacers is decreased. On the other hand, the post spacer can chemical cross-link with the material of the alignment layers under the irradiation of a ultraviolet light, thereby fixing the post spacers between the upper alignment layer and the lower alignment layer. Therefore, when the liquid crystal display panel is flexible or bent, the post spacers do not slide easily. Meanwhile, the material of the post spacers having a higher relative molecular weight may also have higher strength and toughness, thereby ensuring the stability of the upper and lower substrates, the fixation of the liquid crystal cell gap, and the normal display image.

BRIEF DESCRIPTION OF THE DRAWINGS

The above and other aspects, features and advantages of the embodiments of the present disclosure will become more apparent through the description below in conjunction with the drawings, in which.

DETAILED DESCRIPTION OF EXEMPLARY EMBODIMENTS

Figure 1:
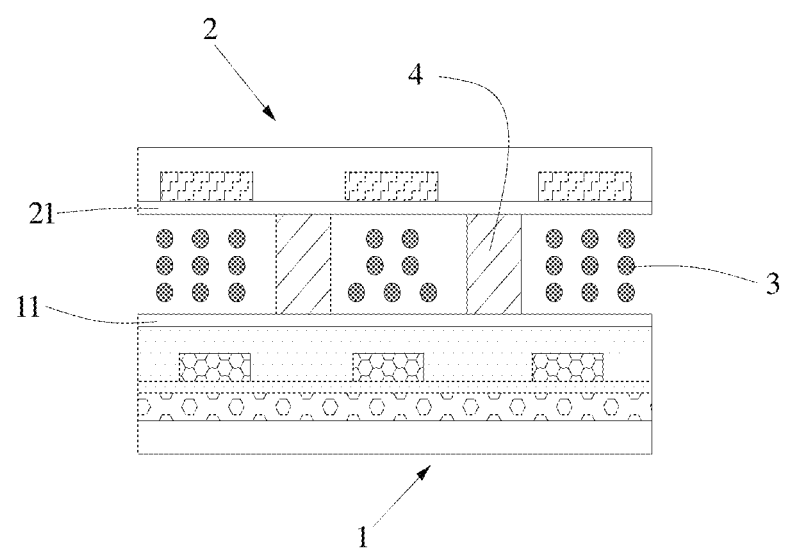
FIG. 1 is a schematic diagram of a structure of a liquid crystal display panel in the prior art.
Figure 2:
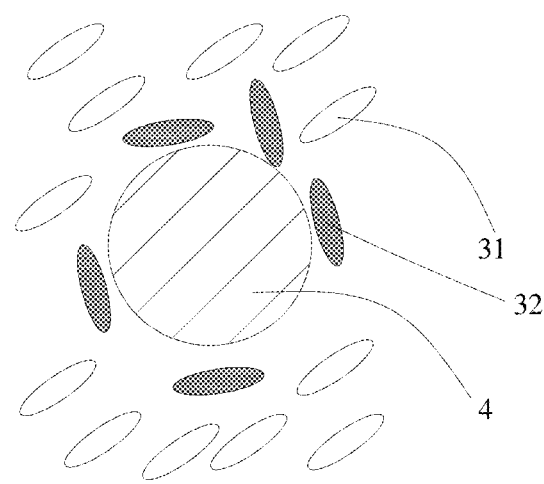
FIG. 2 is a schematic diagram of an abnormal alignment of the liquid crystal molecules surrounding a post spacer in the prior art.

The embodiments of the present disclosure will be described in detail with reference to the drawings below. However, the present disclosure can be implemented in many various ways, and the present disclosure should not be construed as limited to the particular embodiments set forth herein. In contrast, these embodiments are provided to explain the principle of the present disclosure and the actual application thereof, such that other ones skilled in the art can understand various embodiments of the present disclosure and various amendments suitable for specific expected application. In the drawings, the shape and the size of the elements can be exaggerated for clarity, and same reference numerals refer to the same or similar elements throughout.

The present disclosure provides a liquid crystal display (LCD) panel, which includes a thin film transistor (TFT) substrate and a color filter (CF) substrate which are disposed opposite to each other, and a liquid crystal layer interposed between the TFT substrate and the CF substrate, wherein a lower alignment layer is provided at a side of the TFT substrate that is close to liquid crystal layer, an upper alignment layer is provided at a side of the CF substrate that is close to the liquid crystal layer, and post spacers (PSs) are provided between the upper alignment layer and the lower alignment layer. The TFT substrate includes active devices, and the CF substrate includes a photoresist. A lower polarizer and an upper polarizer are respectively attached to the outsides of the TFT substrate and the CF substrate that are opposite to each other. The structure of the liquid crystal display panel is not special, and those skilled in the art can refer to the prior art, which will not be repeated herein.

The material of the post spacers in the liquid crystal display panel according to the present disclosure is emphasized. There is chemical crosslinking between the material of the post spacers and that of the upper alignment layer and between the material of the post spacers and that of the lower alignment layer, and there is a hydrogen-bond interaction or intermolecular force between the material of the post spacers and the liquid crystal molecules of the liquid crystal layer, such that the liquid crystal molecules surrounding the post spacers can generate an alignments that is consistent with the upper alignment layer and the lower alignment layer like the liquid crystal molecules close to the TFT substrate and the CF substrate.

Figure 3:
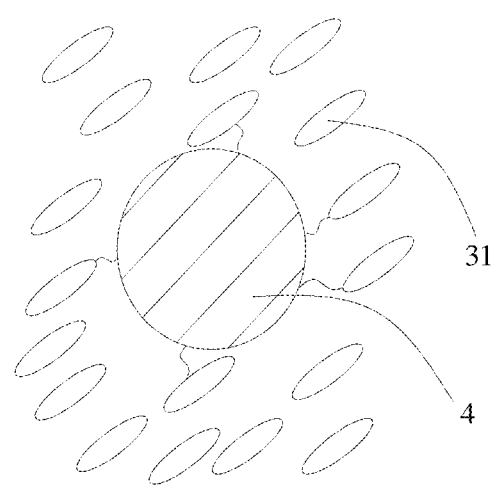
FIG. 3 is a schematic diagram of a normal alignment of the liquid crystal molecules surrounding a post spacer according to the present disclosure.

As such, when the liquid crystal display panel of the present disclosure uses the post spacers described above, on one hand, the hydrogen-bond interaction or the intermolecular force generated between the material of the post spacers and the liquid crystal molecules in the liquid crystal layer may change the disordered arrangement of the liquid crystal molecules surrounding the post spacers in the prior art, so as to enable these liquid crystal molecules to form an alignment that is consistent with or similar to the alignment layers. As shown in FIG. 3, the internal interaction between the liquid crystal molecules is reduced, and the alignment of the liquid crystal molecules surrounding the post spacer 4 is also consistent with the alignment of the liquid crystal molecules 31 close to the TFT substrate and the CF substrate, thereby decreasing the light leakage situation around the post spacer. On the other hand, the chemical crosslinking between the material of the post spacer and the materials of the upper and lower alignment layers is also able to fix the post spacer between the upper alignment layer and the lower alignment layer. When the liquid crystal display panel is flexible or bendable, the post spacer does not slide easily, thereby ensuring the stabilities of the TFT substrate and the CF substrate, the fixation of the liquid crystal cell gap, and the normal display image.

In particular, the material of the post spacer has a structure represented by Formula 1:

Formula 1

X includes at least one selected from groups represented by Formulae 2-1, 2-2, 2-3, 2-4, and 2-5 below:

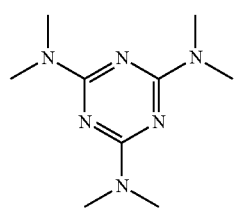

Formula 2-1

-continued

Formula 2-2

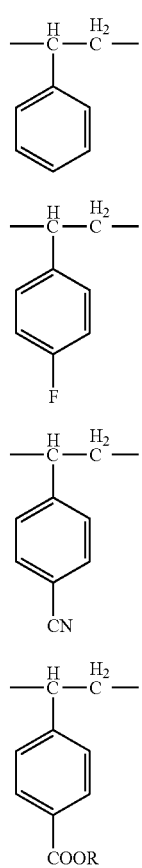

Formula 2-3

Formula 2-4

Formula 2-5

Y includes at least one selected from groups represented by Formulae 3-1 and 3-2 below:

Formula 3-1

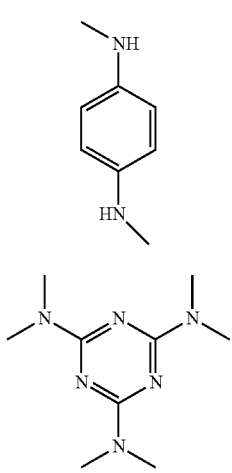

Formula 3-2

At least one of the X and the Y has a molecular chain end having a first group that is capable of chemically cross-linking with the materials of the upper and lower alignment layers. The first group is at least one selected from an azo group (—N═N—), an imide group (—CO—NH—) and an amine group (—NH—). At least one of the X and the Y has a side chain, and the side chain has a second group that is capable of generating a hydrogen bond or intermolecular force with material of the liquid crystal molecules. The second group is at least one selected from an alkyl chain having a carbon chain length of 8 to 20 carbon atoms, a cyano group (—CN), a fluoro group (—F), a hydroxyl group (—OH) and an ester group (—COOR). Since the alignment layers are organic film layers that contain chemical groups of an epoxy group (—CH(O)CH—), a hydroxyl group (—OH), a carboxyl group (—COOH), etc., the first group located in the molecular chain end can chemically cross-link with the materials of the upper and lower alignment layers; meanwhile, since the material of the liquid crystal molecules generally has at least one group selected from a $C_8$ to $C_{20}$ alkyl chain, a cyano group, a fluoro group, a hydroxyl group, an ester group, etc., the second group located in the side chain has a similar polarity to the liquid crystal molecules, such that the hydrogen-bond interaction or intermolecular force may occur between the second group and the liquid crystal molecules, to change the disordered arrangement of the liquid crystal molecules surrounding the post spacer. Thus, these liquid crystal molecules can form an alignment that is consistent with or similar to the alignment layers, the internal interaction between the liquid crystal molecules is reduced, and the light leakage surrounding the post spacer is decreased.

In other words, the material of the post spacer provided by the present disclosure has a basic molecular framework that is formed by connecting any one of groups represented by Formulae 2-1 to 2-5 with any one of groups represented by Formulae 3-1 to 3-2 in the form of Formula 1. On a basis of the framework, at least one end of the molecular chain has the first group that is capable of chemically crosslinking with the materials of the upper and lower alignment layers, and a side chain of the molecular chain has the second group that is capable of generating a hydrogen bond or intermolecular force with the material of the liquid crystal molecules. It is worth noted that, the first group and second group may be the group of the framework itself, and may be other substituent connected to the framework.

Further, the material of the post spacer has a net structure, or a linear structure having a relative molecular weight of 50000~100000. As such, the material of the post spacer having a larger relative molecular weight also has higher strength and toughness, such that the stabilities of the TFT substrate and the CF substrate and the fixation of the liquid crystal cell gap are ensured.

Hereinafter, the material of the post spacer described above is illustrated according to embodiments. The material of the post spacer in the liquid crystal display panel according to the present disclosure is not limited to the description of the embodiments below, and these embodiments are only provided to be examples of some materials.

Embodiment 1

The material of the post spacer provided by the present embodiment has a structure represented by Formula 4-1:

Formula 4-1

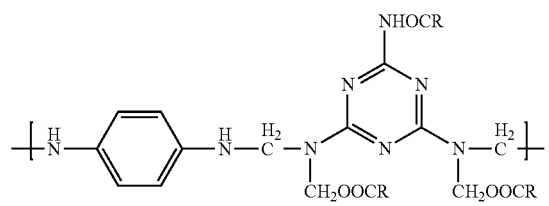

In particular, the material of the post spacer of the present embodiment is prepared by the reaction scheme below:

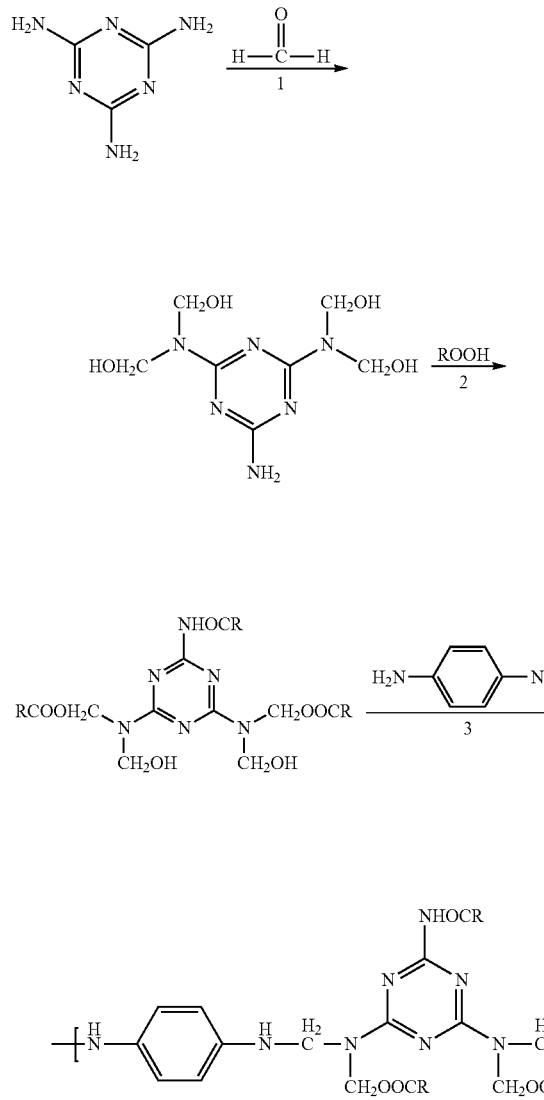

There are three reaction steps: reaction 1 is a hydroxymethylation reaction of tripolycyanamide and methanal in a weak alkaline condition, in particular, which is conducted at a temperature of 50-80° C. for 2-10 hours to form hexamethylol melamine; reaction 2 is a partial etherification reaction of the hexamethylol melamine in an alcoholic solution in acid medium, which is conducted for 1-3 hours to form monohydroxymethyl derivatives; reaction 3 is an esterification reaction of the monohydroxymethyl derivatives in an alkaline condition, to form monohydroxymethyl monoester derivatives. Thus, a polymer having a linear structure as shown in Formula 4-1 is formed.

Embodiment 2

The material of the post spacer provided by the present embodiment has a structure represented by Formula 4-2:

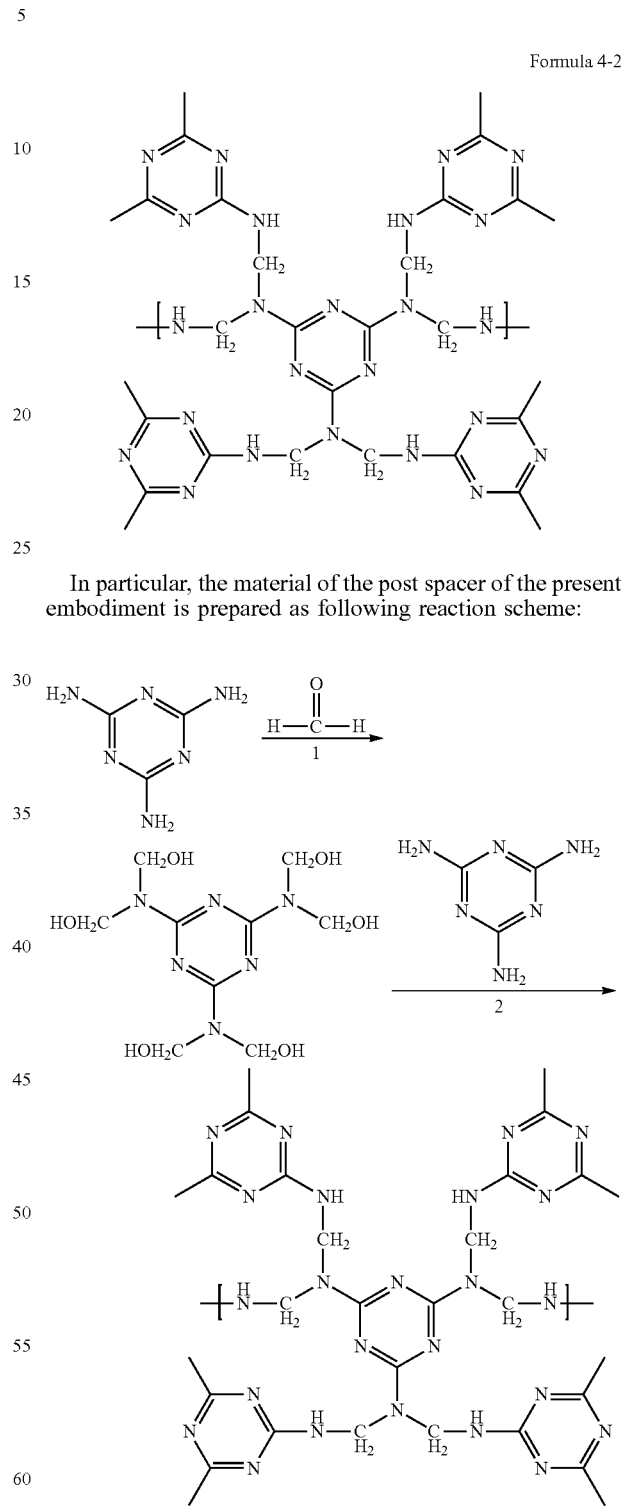

In particular, the material of the post spacer of the present embodiment is prepared as following reaction scheme:

There are two reaction steps, wherein reaction 1 is a complete hydroxylation reaction of tripolycyanamide with excessive methanal in a weak alkaline condition, in particular, at a temperature of 50~80° C. for 2~10 hours, to form hexamethylol melamine; and reaction 2 is a hydroxylammonia condensation reaction of the hexamethylol melamine with tripolycyanamide in an alkaline condition. Since there are a lot of the reaction sites of the reactant, a polymer having a network structure as shown in Formula 4-2 is formed.

It is worth noted that, except for a method of manufacturing a general liquid crystal display panel, in the manufacturing process of the liquid crystal display panel of the present disclosure, the material of the post spacer is treated after completing the manufacture of the liquid crystal cell, and then the liquid crystal display panel can be formed. In particular, a method of manufacturing the liquid crystal display panel described above includes steps below.

Step S1 comprising providing a TFT substrate and a CF substrate that are disposed opposite to each other.

In particular, a lower alignment layer is provided at a side of the TFT substrate facing the CF substrate, and an upper alignment layer is provided at a side of the CF substrate facing the TFT substrate.

Step S2 comprising aligning the TFT substrate and the CF substrate after liquid crystals are coated on the lower alignment layer and/or the upper alignment layer, and manufacturing the post spacers between the lower alignment layer and the upper alignment layer to form a liquid crystal cell.

In particular, the above described material of the post spacers is used to manufacture the post spacers herein, the post spacers can be manufactured by any of spraying, photolithography, imprinting and self-assembling. The particular manufacture process will not be repeated.

Step 3 comprising irradiating the liquid crystal cell with ultraviolet light, such that the molecular chain end in the material of the post spacers chemical cross-links with the materials of the lower alignment layer and the upper alignment layer, to obtain a liquid crystal display panel.

Preferably, a liquid crystal cell is obtained by irradiating with ultraviolet light having a wavelength of 245 nm for 30-60 minutes. Since a cover plate in the liquid crystal cell that has been packaged is transparent, chemical crosslinking reactions may occur between the material of the post spacers and the material of the upper alignment layer and between the material of the post spacers and the material of lower alignment layers under the ultraviolet light. The degree of the crosslinking can be measured by characterization means of infrared spectroscopic analysis, etc.

As such, the problem of relatively severe light leakage phenomenon due to the variation of the deflection of the liquid crystal molecules surrounding the post spacers in the liquid crystal display panel in the prior art can be resolved; meanwhile the problem of the display effect and the variation in the liquid crystal cell gap resulting from the easy detachment of the post spacers when the liquid crystal display panel is flexible or bent can also be resolved, by replacing the post spacers in the prior art with the post spacers provide by the present disclosure and adding ultraviolet light irradiating treatment after obtaining the liquid crystal cell through capsulation.

Although the present disclosure has been illustrated and described by referring to the particular embodiments, it will be understood by those of skill in the art that various changes in form and details may be made without departing from the spirit and the scope of the present disclosure as defined by the following claims and equivalents thereof.

What is claimed:

1. A post spacer, applied to a liquid crystal display panel and comprising a material of a structure represented by Formula 1:

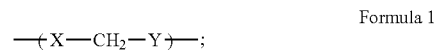

wherein X comprises at least one selected from groups represented by Formula 2-1 below:

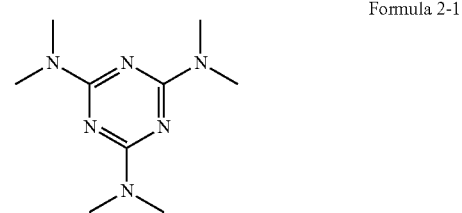

Y comprises at least one selected from groups represented by Formula 3-1 below:

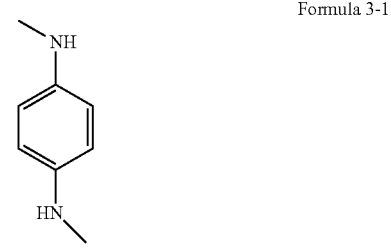

wherein at least one of the X and the Y has a molecular chain end having a first group, which is capable of chemically cross-linking with a material of an alignment layer in the liquid crystal display panel, and at least one of the X and the Y has a side chain having a second group, which is capable of generating a hydrogen bond or intermolecular force with a material of liquid crystal molecules in the liquid crystal display panel.

2. The post spacer of claim 1, wherein the first group is at least one selected from a group consisting of an azo group, an imide group and an amine group, and
wherein the second group is at least one selected from a group consisting of a $C_8$ to $C_{20}$ alkyl chain, a cyano group, a fluoro group, a hydroxyl group and an ester group.

3. A liquid crystal display panel comprising:
a first alignment layer and a second alignment layer, which are disposed opposite from each other;
a liquid crystal layer interposed between the first alignment layer and the second alignment layer; and
the post spacer of claim 2 disposed between the first alignment layer and the second alignment layer,
wherein the liquid crystal layer includes liquid crystal molecules that has at least one group selected from a group consisting of a $C_8$ to $C_{20}$ alkyl chain, a cyano group, a fluoro group, a hydroxyl group and an ester group.

4. A liquid crystal display panel comprising:
a first alignment layer and a second alignment layer, which are disposed opposite from each other;
a liquid crystal layer interposed between the first alignment layer and the second alignment layer; and
the post spacer of claim 2 disposed between the first alignment layer and the second alignment layer,
wherein the first alignment layer, the second alignment layer, or both include a material having at least one group selected from a group consisting of an epoxy group, a hydroxyl group and a carboxyl group.

5. The post spacer of claim 1, wherein the material of the post spacer has a net structure, or a linear structure having a relative molecular weight of 50000~100000.

6. A liquid crystal display panel, comprising:
a thin film transistor (TFT) substrate and a color filter (CF) substrate disposed opposite to each other; and
a liquid crystal layer interposed between the TFT substrate and the CF substrate,
wherein a lower alignment layer is provided at a side of the TFT substrate close to the liquid crystal layer, an upper alignment layer is provided at a side of the CF substrate close to the liquid crystal layer, and post spacers are disposed between the upper alignment layer and the lower alignment layer,
wherein the post spacers comprise a material having a structure represented by Formula 1:

Formula 1 wherein X comprises at least one selected from groups represented by Formula 2-1 below:

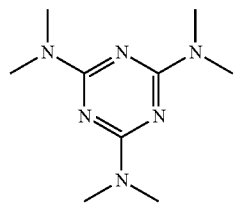

Formula 2-1

Y comprises at least one selected from groups represented by Formula 3-1 below:

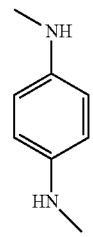

Formula 3-1 at least one of the X and the Y has a molecular chain end having a first group that is capable of chemically cross-linking with materials of the upper alignment layer and the lower alignment layer; and at least one of the X and the Y has a side chain having a second group that is capable of generating a hydrogen bond or intermolecular force with a material of liquid crystal molecules in the liquid crystal layer; and
wherein the molecular chain end in the material of the post spacers has chemical crosslinking with the materials of the upper alignment layer and the lower alignment layer, the hydrogen bond or the intermolecular force is generated between the side chain in the material of the post spacers and the liquid crystal molecules, such that the liquid crystal molecules have an alignment that is consistent with the upper alignment layer and lower alignment layer.

7. The liquid crystal display panel of claim 6, wherein the first group is at least one selected from the group consisting of an azo group, an imide group and an amine group, and the second group is at least one selected from the group consisting of a $C_8$ to $C_{20}$ alkyl chain, a cyano group, a fluoro group, a hydroxyl group and an ester group.

8. The liquid crystal display panel of claim 7, wherein the material of the liquid crystal molecules has at least one group selected from the group consisting of a $C_8$ to $C_{20}$ alkyl chain, a cyano group, a fluoro group, a hydroxyl group and an ester group, and the upper alignment layer and the lower alignment layer each comprises a material having at least one group selected from the group consisting of an epoxy group, a hydroxyl group and a carboxyl group.

9. The liquid crystal display panel of claim 7, wherein the material of the post spacers has a net structure, or a linear structure having a relative molecular weight of 50000~100000.

10. The liquid crystal display panel of claim 6, wherein the material of the post spacers has a net structure, or a linear structure having a relative molecular weight of 50000~100000.

11. A method of manufacturing a liquid crystal display panel, comprising:
S1 comprising providing a thin film transistor (TFT) substrate and a color filter (CF) substrate that are disposed opposite to each other, wherein a lower alignment layer is provided at a side of the TFT substrate facing the CF substrate, and an upper alignment layer is provided at a side of the CF substrate facing the TFT substrate;
S2 comprising aligning the TFT substrate and the CF substrate after liquid crystals are coated on the lower alignment layer and/or the upper alignment layer, and forming post spacers between the lower alignment layer and the upper alignment layer to form a liquid crystal cell, wherein the post spacers comprise a material having a structure represented by Formula 1:

Formula 1 wherein X comprises at least one selected from groups represented by Formula 2-1 below:

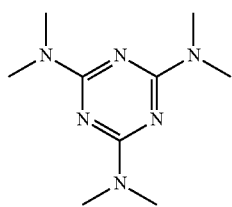

Formula 2-1

Y comprises at least one selected from groups represented by Formula 3-1 below:

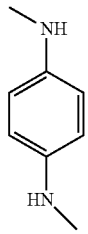

Formula 3-1 wherein at least one of the X and the Y has a molecular chain end having a first group that is capable of chemically cross-linking with materials of the upper alignment layer and the lower alignment layer; and at least one of the X and the Y has a side chain having a second group that is capable of generating a hydrogen bond or intermolecular force with a material of the liquid crystals; and S3 comprising irradiating the liquid crystal cell with ultraviolet light, such that the molecular chain end in the material of the post spacers chemically cross-links with the materials of the lower alignment layer and the upper alignment layer to obtain the liquid crystal display panel.

12. The method of claim 11, wherein the first group is at least one selected from the group consisting of an azo group, an imide group and an amine group, and the second group is at least one selected from the group consisting of a $C_8$ to $C_{20}$ alkyl chain, a cyano group, a fluoro group, a hydroxyl group and an ester group.

13. The method of claim 12, wherein the material of the liquid crystals has at least one group selected from the group consisting of a $C_8$ to $C_{20}$ alkyl chain, a cyano group, a fluoro group, a hydroxyl group and an ester group; and the upper alignment layer and the lower alignment layer each comprises a material having at least one group selected from the group consisting of an epoxy group, a hydroxyl group and a carboxyl group.

14. The method of claim 12, wherein the material of the post spacers has a net structure, or a linear structure having a relative molecular weight of 50000~100000.

15. The method of claim 11, wherein the material of the post spacers has a net structure, or a linear structure having a relative molecular weight of 50000~100000.

16. The method of claim 11, wherein the forming of the post spacers is performed by any of spraying, photolithography, imprinting and self-assembling.

17. The method of claim 15, wherein the forming of the post spacers is performed by any of spraying, photolithography, imprinting and self-assembling.

* * * * *